W. C. CULBERTSON.
LIQUID SUPPLY REGULATOR.
APPLICATION FILED MAY 24, 1912.
1,062,537.
Patented May 20, 1913.
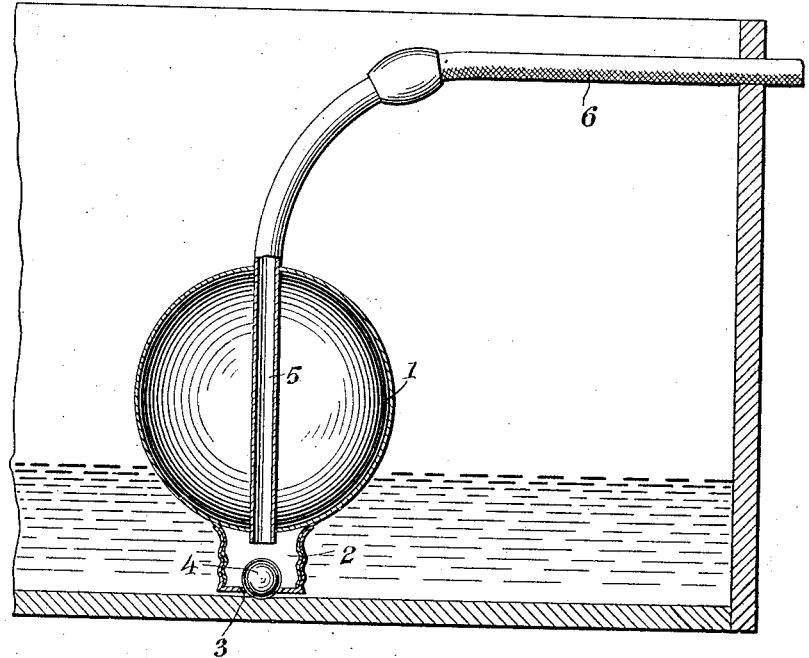
Inventor
William C. Culbertson
Witnesses
By Victor J. Evans
Attorney

UNITED STATES PATENT OFFICE.

WILLIAM C. CULBERTSON, OF RUSHVILLE, INDIANA.

LIQUID-SUPPLY REGULATOR.

1,062,537.  Specification of Letters Patent.  Patented May 20, 1913.

Application filed May 24, 1912. Serial No. 699,474.

*To all whom it may concern:*

Be it known that I, WILLIAM C. CULBERTSON, a citizen of the United States, residing at Rushville, in the county of Rush and State of Indiana, have invented new and useful Improvements in Liquid-Supply Regulators, of which the following is a specification.

This invention relates to liquid supply regulators, the object in view being to provide an exceedingly simple and reliable device for regulating the depth of water or oil or other liquid in a tank or other receptacle, the device being especially useful in connection with water or oil tanks, or troughs for animals, poultry, and the like.

With the above and other objects in view, the invention consists in the construction, combination and arrangement of parts, as will be hereinafter more fully described, illustrated in the accompanying drawings, and pointed out in the claim hereunto appended.

The accompanying drawing represents a vertical sectional view of the regulator mounted in a tank.

Referring to the drawing, 1 designates an air-tight float, which for convenience is shown in the form of a hollow sheet metal sphere. Extending downwardly from the bottom of the float is a valve neck 2, the bottom of which is formed with a valve opening 3, in which is seated a valve 4 which for convenience and the sake of economy is shown in the form of a ball. It will be observed that a portion of the ball projects below the bottom of the neck, and is disposed so as to come into contact with the bottom of the tank or receptacle, or other support therein, which thereby acts to unseat the valve and allow liquid to flow into the receptacle, until the level thereof is sufficient to act upon the float 1, causing the same to move upward and allowing the valve 4 to again seat itself, thus cutting off the further supply of liquid.

Extending diametrically and vertically through the float 1 is a liquid supply pipe 5, to which a flexible hose 6 is adapted to be connected, said hose leading to any suitable point of supply. The pipe 5 extends entirely through the float, and opens into the neck 2 over the valve 4. This pipe 5 is effectively sealed where it passes through the float, so as not to allow any air to enter the float 1.

From the foregoing description, it will be seen that it is only necessary to place the regulator in a tank or other receptacle of any size or shape, allowing the valve 4 to come into contact with the bottom of such tank, or other support therein, such as a shelf. This allows the liquid to flow through the valve opening, and partially fill the tank, until the level of the liquid reaches a point where it will elevate the float. As soon as this takes place, the valve becomes seated and cuts off the further supply of liquid. In this way, the liquid level in the tank is maintained the same at all times.

What is claimed is:

A floating level regulator, comprising in combination with a tank, an air-tight float, a valve neck at the bottom of the float provided with a valve seat and opening therein, a valve normally closing said opening and adapted to be unseated by coming into contact with an underlying support, and a liquid supply pipe passing diametrically through the float from top to bottom and discharging into the valve neck.

In testimony whereof I affix my signature in presence of two witnesses.

WILLIAM C. CULBERTSON.

Witnesses:
　WILL M. SPARKS,
　A. L. GARY.

Copies of this patent may be obtained for five cents each, by addressing the "Commissioner of Patents, Washington, D. C."